(12) United States Patent
Kozitsky et al.

(10) Patent No.: US 9,042,647 B2
(45) Date of Patent: May 26, 2015

(54) ADAPTIVE CHARACTER SEGMENTATION METHOD AND SYSTEM FOR AUTOMATED LICENSE PLATE RECOGNITION

(71) Applicant: Xerox Corporation, Norwalk, CT (US)

(72) Inventors: Vladimir Kozitsky, Rochester, NY (US); Aaron Burry, Ontario, NY (US); Claude Fillion, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 202 days.

(21) Appl. No.: 13/911,448

(22) Filed: Jun. 6, 2013

(65) Prior Publication Data

US 2014/0363052 A1 Dec. 11, 2014

(51) Int. Cl.
*G06K 9/00* (2006.01)

(52) U.S. Cl.
CPC ................... *G06K 9/00624* (2013.01)

(58) Field of Classification Search
CPC ....... G06K 9/00; G06K 9/03; G06K 9/00469; G06K 9/20; G06K 9/2054; G06K 9/32; G06K 9/3241; G06K 9/325; G06K 9/3258; G06K 9/3283; G06K 9/34; G06K 9/344; G06K 9/38; G06K 9/42; G06K 9/6202; G06K 9/6279; G06K 9/6814; G06K 9/6857; G06K 2209/01; G06K 2209/15; G06T 3/00; G06T 3/40; G06T 7/0022; G06T 7/0081; G06T 17/00; G06T 2207/20164; G06T 2207/20228; G06T 2207/30236; H04N 5/224; G08G 1/0175; G08G 1/20
See application file for complete search history.

(56) References Cited

U.S. PATENT DOCUMENTS

| | | | |
|---|---|---|---|
| 4,481,665 A | 11/1984 | Ota | |
| 5,172,422 A | 12/1992 | Tan | |
| 6,124,864 A | 9/2000 | Madden et al. | |
| 6,327,385 B1 | 12/2001 | Kamitani | |
| 6,339,651 B1 * | 1/2002 | Tian et al. | 382/105 |
| 6,473,517 B1 * | 10/2002 | Tyan et al. | 382/105 |
| 6,546,119 B2 * | 4/2003 | Ciolli et al. | 382/104 |
| 7,302,098 B2 * | 11/2007 | Tang et al. | 382/177 |
| 7,480,411 B1 | 1/2009 | Tzadok et al. | |
| 7,613,328 B2 * | 11/2009 | Boregowda et al. | 382/105 |
| 8,134,578 B2 | 3/2012 | Fillion et al. | |
| 8,243,140 B1 * | 8/2012 | Howe | 348/149 |
| 8,270,771 B2 | 9/2012 | Fillion et al. | |
| 8,290,213 B2 | 10/2012 | Chen et al. | |
| 8,320,629 B2 * | 11/2012 | Hofman et al. | 382/105 |
| 8,331,621 B1 | 12/2012 | Allen et al. | |
| 8,447,112 B2 * | 5/2013 | Paul et al. | 382/182 |
| 8,483,440 B2 * | 7/2013 | Fan et al. | 382/105 |
| 8,644,561 B2 * | 2/2014 | Burry et al. | 382/107 |
| 8,731,244 B2 * | 5/2014 | Wu | 382/105 |
| 8,781,172 B2 * | 7/2014 | Kozitsky et al. | 382/105 |

(Continued)

*Primary Examiner* — Jose Couso
(74) *Attorney, Agent, or Firm* — Kermit D. Lopez; Luis M. Ortiz; Ortiz & Lopez, PLLC (57) ABSTRACT

Methods, systems and processor-readable media for adaptive character segmentation in an automatic license plate recognition application. A region of interest can be identified in an image of a license plate acquired via an automatic license plate recognition engine. Characters in the image with respect to the region of interest can be segmented using a histogram projection associated with particular segmentation threshold parameters. The characters in the image can be iteratively validated if a minimum number of valid characters is determined based on the histogram projection and the particular segmentation threshold parameters to produce character images sufficient to identify the license plate.

20 Claims, 8 Drawing Sheets

(56) References Cited

U.S. PATENT DOCUMENTS

| | | |
|---|---|---|
| 2008/0131001 A1 | 6/2008 | Hofman et al. |
| 2009/0208060 A1 | 8/2009 | Wang et al. |
| 2012/0269398 A1 | 10/2012 | Fan et al. |
| 2012/0275653 A1 | 11/2012 | Hsieh et al. |

* cited by examiner

ADAPTIVE CHARACTER SEGMENTATION METHOD AND SYSTEM FOR AUTOMATED LICENSE PLATE RECOGNITION

FIELD OF THE INVENTION

Embodiments are generally related to data-processing methods and systems and processor-readable media. Embodiments are also related to the field of ALPR (Automated License Plate Recognition) applications. Embodiments further relate to character segmentation of acquired images.

BACKGROUND

ALPR is an image-processing approach that often functions as the core module of "intelligent" transportation infrastructure applications. License plate recognition techniques, such as ALPR, can be employed to identify a vehicle by automatically reading a license plate utilizing image processing and character recognition technologies. A license plate recognition operation can be performed by locating a license plate in an image, segmenting the characters in the captured image of the plate, and performing an OCR (Optical Character Recognition) operation with respect to the characters identified.

The ALPR problem is often decomposed into a sequence of image processing operations: locating the sub-image containing the license plate (i.e., plate localization), extracting images of individual characters (i.e., segmentation), and performing optical character recognition (OCR) on these character images. In order for OCR to achieve high accuracy, it is necessary to obtain properly segmented characters.

There are a number of challenging noise sources present in license plate images captured under realistic conditions (i.e., field deployed solutions). These include: heavy shadows, non-uniform illumination (from one vehicle to the next, daytime versus nighttime, etc.), challenging optical geometries (tilt, shear, or projective distortions), plate frames and/or stickers partially touching characters, partial occlusion of characters (e.g., trailer hitch ball), poor contrast, and general image noise (e.g., salt and pepper noise). For some ALPR systems deployed in the United States, variation between states in character font, width, and spacing further add to the difficulty of proper character segmentation.

Current character segmentation subsystems within ALPR applications are structured in two stages. The first stage calculates a vertical projection histogram (a very common segmentation technique) to produce initial character boundaries (cuts), and uses local statistical information, such as median character spacing, to split large cuts (caused by combining characters) and insert missing characters. The operations applied in the first stage require minimal computational resources and consequently are applied to each input image to achieve good character segmentation accuracy. No a-priori image information is utilized in this first stage, enabling robust performance over a variety of state logos, fonts, and character spacing.

The second stage classifies the segmented images as likely to be a valid image for downstream analysis or suspect as invalid and further improves segmentation performance by applying additional analysis to the suspect character images. This additional analysis includes: 1) application of OCR followed by application of state-specific rules to determine validity of suspect characters, and 2) combining of adjoining suspect narrow characters and assessment of OCR confidence of the combined character.

A problem arises when the first stage fails to produce a result that is reasonably close to the correct answer. This is manifested by two or more valid character images missing from the output of the first stage due to an insufficient number of segmentation cuts. The second stage can recover one and in limited cases two character errors, but in general if two or more characters are missing the results will be missing a valid character image coming out of segmentation and regardless of how good OCR or State ID perform, there is no opportunity to obtain the correct license plate.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved ALPR application.

It is another aspect of the disclosed embodiments to provide for adaptive character segmentation methods and systems for use with ALPR applications.

The aforementioned aspects and other objectives and advantages can now be achieved as described herein. Methods and systems for adaptive character segmentation in an automatic license plate recognition application are described. A region of interest can be identified in an image of a license plate acquired via an automatic license plate recognition engine. Characters in the image with respect to the region of interest can be segmented using a histogram projection associated with particular segmentation threshold parameters. The characters in the image can be iteratively validated if a minimum number of valid characters is determined based on the histogram projection and the particular segmentation threshold parameters to produce character images sufficient to identify the license plate.

The disclose embodiments leverage an iterative approach, with feedback from an output metric (e.g., number of "valid" characters as determined by a minimum OCR confidence threshold) to increase the aggressiveness of the segmentation parameters until a result that is sufficiently "believable" is achieved. This result can then be passed along for further processing within segmentation and into OCR. For the histogram projection segmentation approach, the parameter to be adjusted is the threshold level at which the image profile will be cut.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
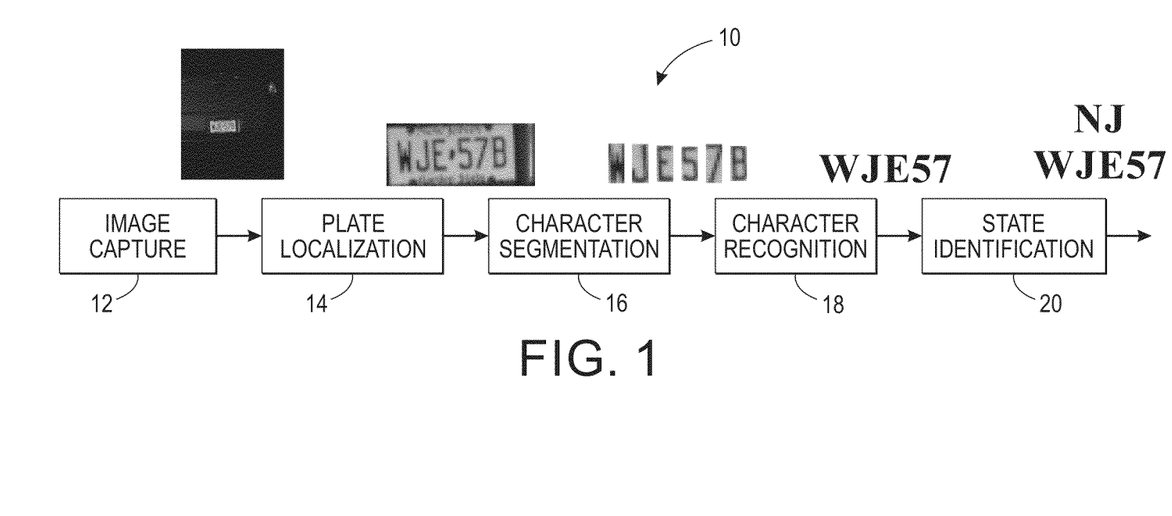
FIG. 1 illustrates a block diagram of an ALPR system, which can be adapted for use in accordance with one or more aspects of the disclosed embodiments.

FIG. 1 illustrates a block diagram of an ALPR system 10, which can be adapted for use in accordance with one or more aspects of the disclosed embodiments. ALPR system 10 generally includes an image capture module 12 that provides data (e.g., an image) to a license plate localization module 14. Output from module 14 is input to a character segmentation module 16, which in turn outputs data that is input to a character recognition module 18. Data output from the character recognition module 18 is provided as input to a state identification module 20. FIG. 1 thus provides a visual context for the character segmentation approach described herein, which utilizes vertical projection histograms to provide an initial set of character boundaries within the tight bounding box image, as will be explained in more detail herein. An alternative ALPR system 130 is also described herein with respect to FIG. 9.

A basic technique of the disclosed embodiments is to leverage an iterative approach with feedback from an output metric (e.g., number of "valid" characters as determined by a minimum OCR confidence threshold) to increase the aggressiveness of the segmentation parameters until a result that is sufficiently "believable" is achieved. This result can then be passed along for further processing within segmentation and into OCR. For the histogram projection segmentation approach, the parameter to be adjusted is the threshold level at which the image profile will be cut.

Given the computational efficiency requirements for most ALPR applications, the method for calculating an output metric that will help guide the segmentation parameter selection needs to be efficient. One advantage in the realm of license plate recognition is that some constraints do exist on the structure of the license plate information itself. For instance, the layout of the license plates (number of symbols, presence of logos, etc.) for a given jurisdiction (state) is typically known a priori. So, one simple approach would be to compare the number of segmented characters produced by the initial segmentation process with the number expected on the license plate. Note that for any given license plate image, we still don't know a priori how many characters actually exist in that particular plate. However, we can enforce a set of site specific requirements such as a minimum number of valid characters and/or presence of state logos and iteratively repeat the call to stage 1 (i.e., recall the two-stage discussion presented earlier) with an updated parameter set that will force the algorithm to be more aggressive in cutting the plate region image and return a greater number of cropped images.

It is important that in such an approach we slowly, incrementally increase the aggressiveness of stage 1 such that we can stop when the specified criteria is met without becoming overly aggressive in our segmentation (over-segmenting the image). Again, the results from this iterative approach will still be subjected to the analysis of Stage 2 as described in the prior approach section above. So, if an approach is implemented that is slightly conservative on the number of cuts being made in stage 1, stage 2 can be counted on to provide some assistance at picking up single missing character images. However, heavy over-segmentation of the image tends to be much more difficult to recover.

The test of segmentation image validity ("believability") can be accomplished via a number of means. The following three examples are provided herein for reference and are not limiting features of the disclosed embodiments:

1) A simple count of the number of cropped images returned by segmentation.
2) Using an image-based classifier (character/non-character (CNC) classifier) that has been trained on cropped images from the particular installation to determine whether any cropped image is a valid character, logo, or stacked character.
3) Leveraging OCR classifiers that return a confidence value with conclusion of labels for A-Z, 0-9, key symbols, and stacked characters. (This can be implemented in a preferred embodiment as it provides the most accurate setting of the segmentation threshold parameter).

Figure 2:
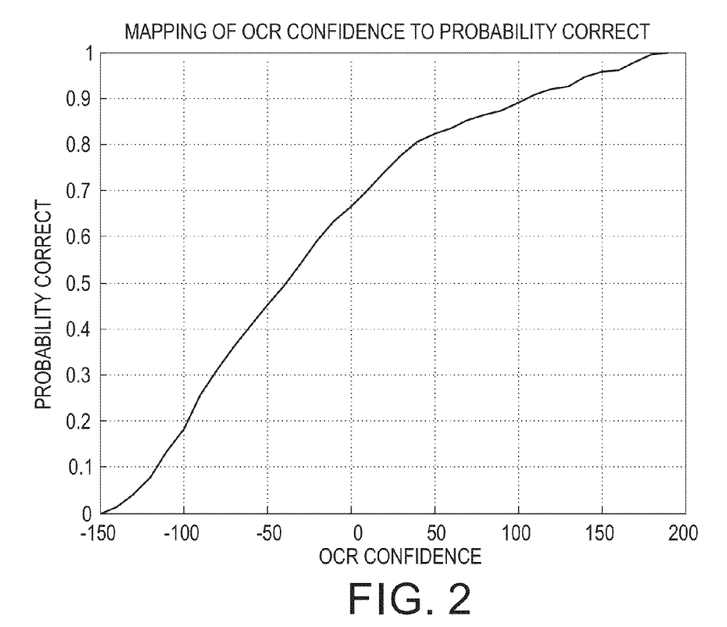
FIG. 2 illustrates a graph depicting data indicative of the probability of a correct OCR versus OCR confidence data.

Option 1 is the most trivial and typically yields the worst results. Getting a count of the "believable" character images using option 2 can be accomplished by counting the number of images that are classified as positive by the classifier. However, given the wide intra-class variance for this classifier, the result isn't nearly as accurate as for option 3. For option 3, we have a plot of accuracy for a given confidence and can use a confidence threshold requirement before a result is deemed to be a valid character. This is illustrated in FIG. 2. Plate borders, general pictorials, and other non-character images will typically return a very low OCR confidence. The best results were achieved using option 3. The threshold for classification as a valid character is typically set at a probability of 60%.

Figure 3:
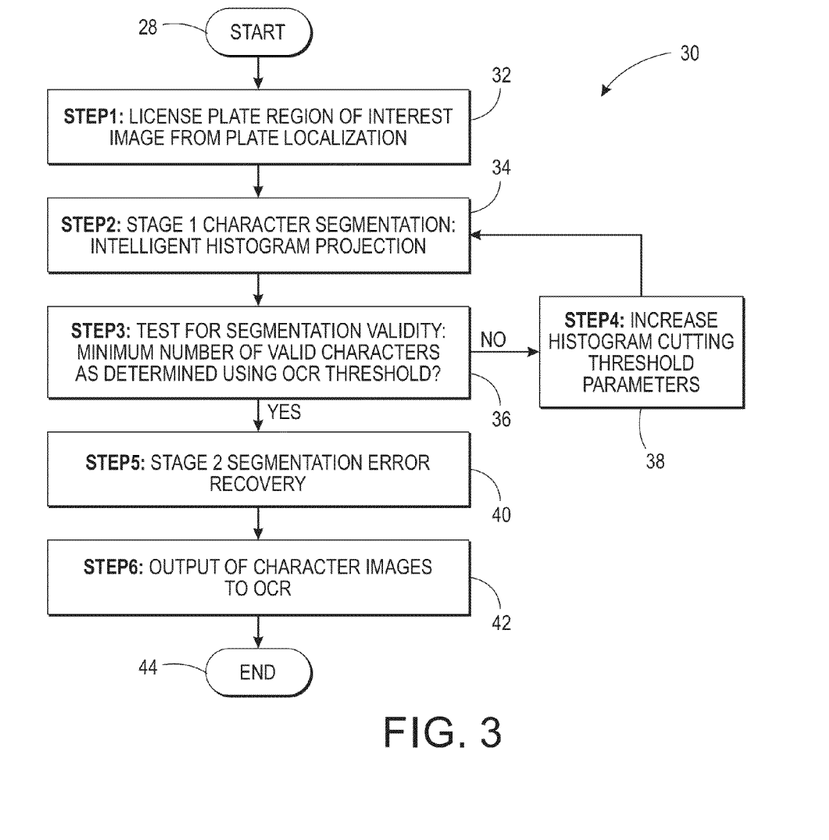
FIG. 3 illustrates a high-level flow chart of operations depicting logical operational steps of a method for character segmentation, which can be implemented in accordance with a preferred embodiment.

FIG. 3 illustrates a high-level flow chart of operations depicting logical operational steps of a method 30 for character segmentation, which can be implemented in accordance with a preferred embodiment. As indicated at block 28, the process is initiated. Then, as shown at block 32, a step or logical operation can be implemented acquiring a license plate ROI (Region of Interest) image from a plate localization operation such as the plate localization step depicted in block 14 of FIG. 1.

Then, as shown at block 34, a character segmentation operation can be implemented based on an intelligent histogram projection. Thereafter, as described at block 36, a test can be performed to determine segmentation validity. That is, if "YES", the minimum number of valid characters is determined using an OCR threshold, then the operations described at blocks 40, 42 are implemented and then processed. If not or "NO", then a step or logical operation is depicted as shown at block 38 to increase histogram cutting threshold parameters, and so forth. Assuming the "YES" response results from the operation depicted at block 36, then a stage 2 segmentation error recovery operation can be implemented, followed by the output of character images to OCR as shown at block 42. The process then terminates, as indicated at block 44.

FIG. 3 illustrates the overall process flow for one embodiment. Note that other more complex methods of examining the fitness (i.e. believability) of the resultant segmentation are also possible. For instance, in an alternate embodiment the segmentation results from each iteration of stage 1 are passed through stage 2 of segmentation (merging and splitting), character recognition (OCR), and finally state identification. In this way, an estimate of the complete plate code and state of origin are obtained with an associated confidence value. Again, by setting a minimum confidence threshold the aggressiveness of the segmentation can be slowly increased until the required confidence is achieved or we have exhausted our predefined search window. The search can also be conducted in two phases: first changing the segmentation parameters to achieve the required minimum number of believable characters, then adjusting until a minimum confidence is achieved. A flowchart indicating the process flow of this alternate embodiment is provided in FIG. 4.

Figure 4:
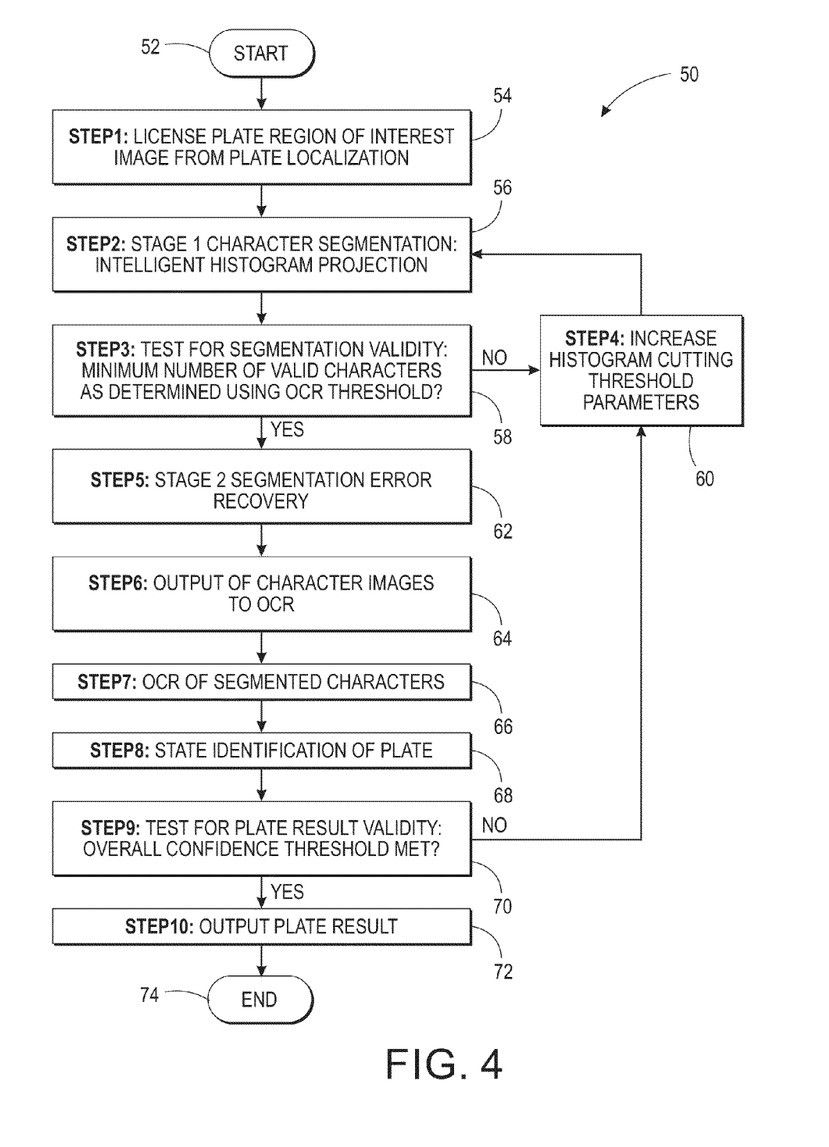
FIG. 4 illustrates a high-level flow chart of operations depicting logical operational steps of a method for character segmentation, which can be implemented in accordance with an alternative embodiment.

FIG. 4 illustrates a high-level flow chart of operations depicting logical operational steps of a method 50 for character segmentation, which can be implemented in accordance with an alternative embodiment. As indicated at block 52, the process can begin. Then, as shown at block 54, a step or logical operation for deriving a license plate ROI image via plate localization operation (e.g., block 14 of FIG. 1) can be implemented. Thereafter, as illustrated at block 56, a character segmentation step or logical operation is implemented based on an intelligent histogram projection.

Next, as shown at block 58, a test for segmentation validity is performed to determine if the minimum number of valid characters is determined using the OCR threshold. If not, then histogram cutting threshold parameters are increased, as shown at block 60 and the operations shown at block 56, etc., are repeated. If the answer is "YES", then the operation shown at block 62 is performed in which a Stage 2 segmentary error recovery is implemented. Then, as described at block 64, a step or logical operation is implemented to output character images to OCR. Next, as illustrated at block 66, OCR of segmented characters occurs, followed by state identification of the license plate, as shown at block 68.

Following implementation of the operation shown at block 68, a test for plate result validity can be performed, as indicated at block 70. In such a test or operation, a determination can be made as to whether or not the overall confidence threshold has been met. If the overall confidence threshold has not been met, then the operation shown at block 60 (i.e., increase cutting threshold parameters) can be implemented and so forth. If the overall confidence threshold has been met, then the license plate result can be output, as shown at block 72, and the process then terminates, as illustrated at block 74.

Once again, it is important to note that the segmentation threshold must be increased in small steps to avoid over-segmentation. A major reason for this is that a maximum confidence value is not necessarily achieved precisely when the correct segmentation occurs. In fact, due to challenging noise sources in license plate images it is possible to achieve a slightly higher confidence value when an over-segmentation occurs (e.g., breaking a "U" into two halves). Thus, by iteratively increasing the aggressiveness of the segmentation parameters until the results are 'just believable', we prevent over-segmentation from clouding judgment of the results.

Figure 5:
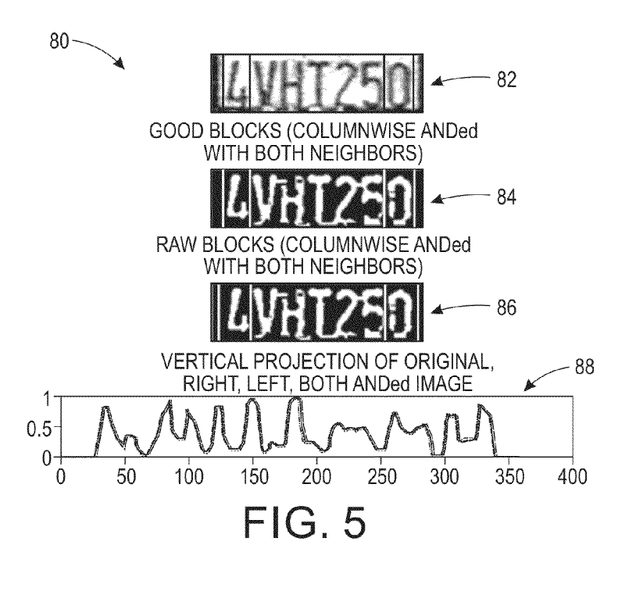
FIG. 5 illustrates example ROI (Region of Interest) images that fail using a prior art segmentation algorithm.

FIG. 5 illustrates example ROI (Region of Interest) images 80 that fail using a prior art segmentation algorithm. Image 82 shown in FIG. 5 represents "good blocks" (i.e., columnwise ANDed with both neighbors). Image 84 represents "raw blocks" (i.e., columnwise ANDed with both neighbors). Image 86 represents the vertical projection of original (k), right (b), left (r), and both (g) ANDed images. A graph 88 plots data associated with these operations.

Figure 6:
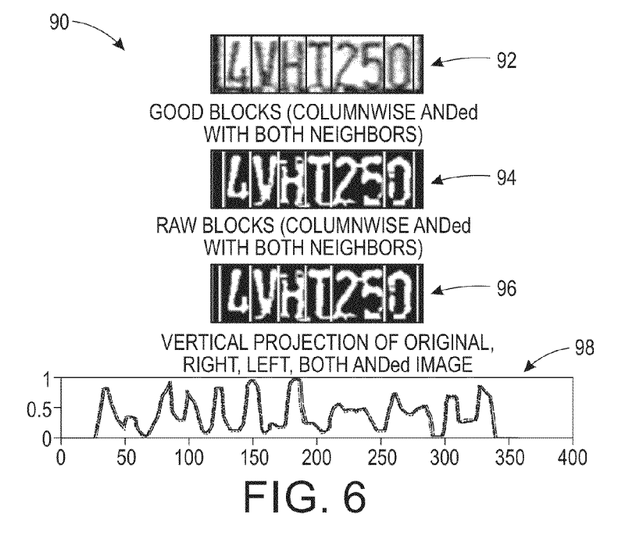
FIG. 6 illustrates example ROI images successfully implemented in accordance with one or more aspects of the disclosed embodiments.

FIG. 6 illustrates example ROI images 90 successfully implemented in accordance with one or more aspects of the disclosed embodiments. Image 92 shown in FIG. 6 represents "good blocks" (i.e., columnwise ANDed with both neighbors). Image 94 represents "raw blocks" (i.e., columnwise ANDed with both neighbors). Image 96 represents the vertical projection of original (k), right (b), left (r), and both (g) ANDed images. A graph 98 plots data associated with these operations.

Figure 7:
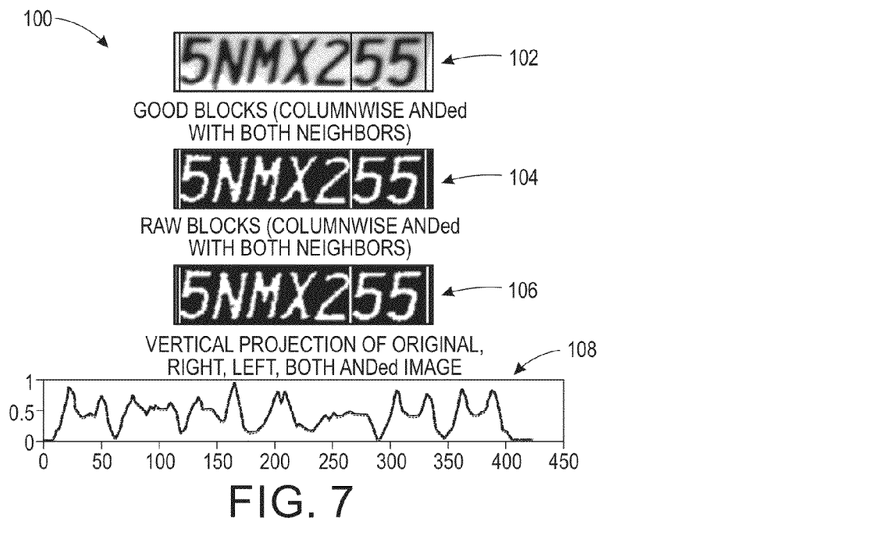
FIG. 7 illustrates example ROI (Region of Interest) images that fail using a prior art segmentation algorithm.

FIG. 7 illustrates example ROI (Region of Interest) images 100 that fail using a prior art segmentation algorithm. Image 102 shown in FIG. 7 represents "good blocks" (i.e., columnwise ANDed with both neighbors). Image 104 represents "raw blocks" (i.e., columnwise ANDed with both neighbors). Image 106 represents the vertical projection of original (k), right (b), left (r), and both (g) ANDed images. A graph 108 plots data associated with these operations.

Figure 8:
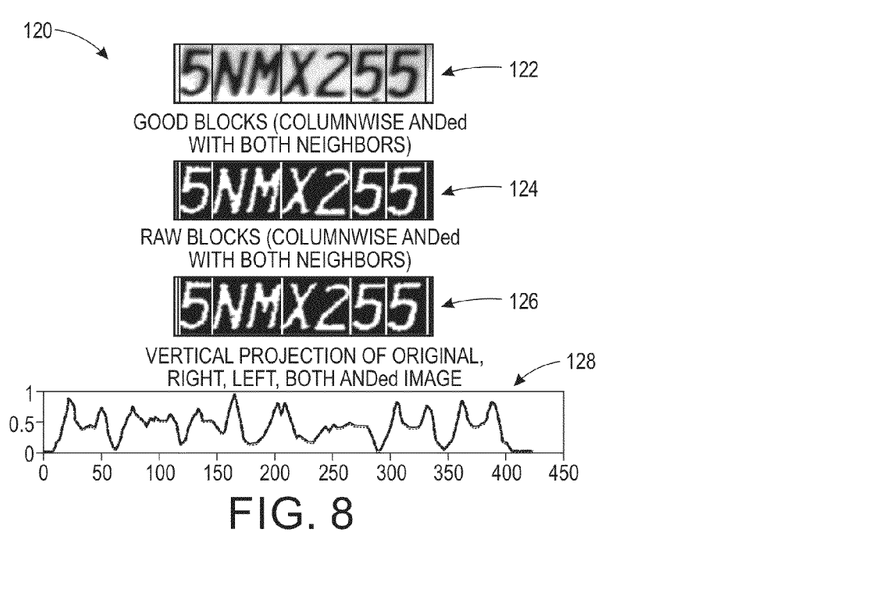
FIG. 8 illustrates example ROI images successfully implemented in accordance with one or more aspects of the disclosed embodiments.

FIG. 8 illustrates example ROI images 120 successfully implemented in accordance with one or more aspects of the disclosed embodiments. Image 122 shown in FIG. 8 represents "good blocks" (i.e., columnwise ANDed with both neighbors). Image 124 represents "raw blocks" (i.e., columnwise ANDed with both neighbors). Image 126 represents the vertical projection of original (k), right (b), left (r), and both (g) ANDed images. A graph 128 plots data associated with these operations.

Several examples of stress images are thus shown subjected to the prior and proposed segmentation methods provided below for reference. FIGS. 5 and 7 illustrate example region of interest (ROI) images that fail using the previous segmentation algorithm. These are typically the most difficult inputs to a character segmentation algorithm. In FIG. 5, a plate cover connects multiple characters and as can be seen in the histogram projection, the character boundaries are difficult to determine. We can correctly segment the leading '4' and the trailing '0' using the baseline stage 1 algorithm but not the 'VHT25' in the middle given the plate cover and excessive background noise between these characters. Using the minimum requirement of 3 valid characters as defined using an OCR threshold of 60% correct and a minimum of 4 segments, we update segmentation parameters and make repeated calls to stage 1 until we correctly segmented more characters. The result is shown in FIG. 6. The only issue remaining is the connected '25' but as we've outlined earlier, the second segmentation stage is designed to recover these types of minor errors. So, the disclosed embodiments can encompass the entire system methodology.

FIG. 7 shows another typical failure case where we have excessive shear in the characters such that when a histogram projection is done, it appears as if these characters are connected. The addition of background noise between the characters makes matters worse. The baseline method returns two major segments, '5NMX2' and '55'. Following the application of the proposed method, we see that in FIG. 8, we have two smaller segments 'NM' and 'X2' that are fixed by the second stage processing.

Some embodiments have been tested on a variety of real-world tolling images. In all cases, the present invention led to an improvement in performance. The improvement varied with image quality and was greater for installations where the image quality was poor and/or imaging resolution was low (i.e. the largest stress existed for the prior techniques). Given the already high accuracy of some ALPR systems, and the extremely demanding accuracy requirements typical of many clients, increasing overall system level performance by more than, for example, one percent is an enormous improvement.

The disclosed embodiments do not break any of the images that are currently processed using the dual stage approach. Rather this new approach identifies cases where the two stage approach has likely failed and carefully adjusts parameters and repeats segmentation as part of a feedback mechanism to provide downstream algorithms a chance to capture the image and obtain the correct code.

Figure 9:
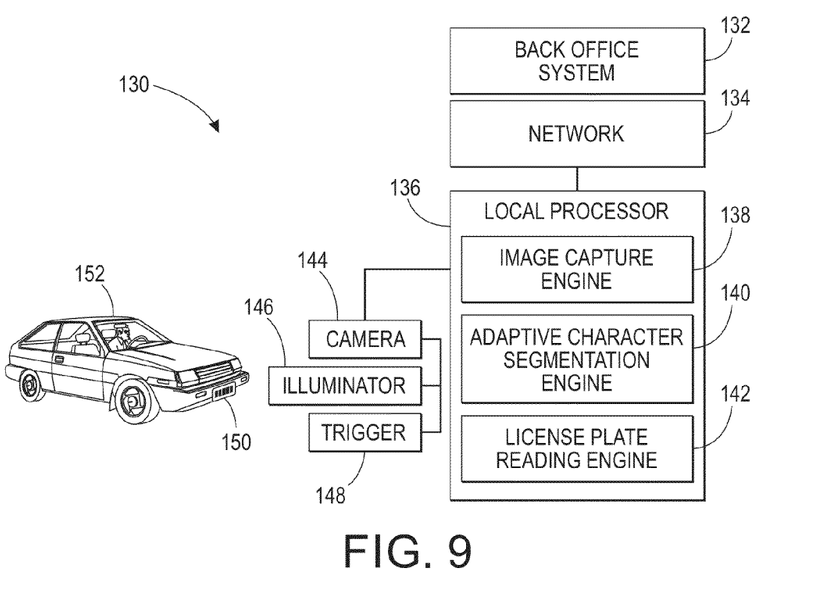
FIG. 9 illustrates a high-level block diagram of an ALPR system for identifying the issuing state of license plate, which can be implemented in accordance with an alternative embodiment.

FIG. 9 illustrates a high-level system diagram of an ALPR system 130 that can be adapted for use in accordance with the disclosed embodiments. The system 130 depicted in FIG. 13 generally includes or can be used with a vehicle 152 with a license plate 150. System 130 includes a trigger 148, a camera 144, and an illuminator 146 for capturing an image. System 130 further includes a local processor 136 that includes an image capture engine 138, an adaptive character segmentation engine 140, and a license plate reading engine 142. System 130 can further include a network 134 (e.g., a local wireless network, the Internet, cellular communications network, other data network, etc.) and a back office system 132 for processing transactions and managing patron accounts. The local processor 136 can communicate with the back office system 132 via the network 134. Note that the adaptive character segmentation engine 140 is similar to the character segmentation module 16 shown in FIG. 1. In fact, the ALPR system 130 shown in FIG. 9 represents a similar but alternative version of the ALPR system 10 shown in FIG. 1.

In FIG. 9, the license plate 150 is depicted located on the front of the vehicle 152, but the license plate 150 could also be located on the rear of the vehicle 152 as well. Some states (e.g., Texas) require license plates in both places, i.e., at the rear and front of a vehicle. In one scenario, the vehicle 152 enters a license plate reading zone which contains a trigger device 148 which controls an illuminator 146 which illuminates the license plate region of the vehicle 152, and a camera 144 which captures images of the license plate 150 on the vehicle 152. The camera 144 can be connected to and/or communicate with the local processor unit 136.

The image capture engine 138 controls the trigger 148, illuminator 146, and camera 144 in order to properly image the vehicle 152 and the license plate 150. An image of the license plate 150 and character segmentation data thereof can then be sent by the local processor 136 over the network 134 to the back office system 132. The back office system 132 can process the license plate and state jurisdiction data and can assess a toll or otherwise interact with a patron account or takes other transportation application specific actions.

As will be appreciated by one skilled in the art, the disclosed embodiments can be implemented as a method, data-processing system, or computer program product. Accordingly, the embodiments may take the form of an entire hardware implementation, an entire software embodiment or an embodiment combining software and hardware aspects all generally referred to as a "circuit" or "module" or "engine". For example an "engine" as discussed may be a software module. Examples of such engines and/or modules include the image capture engine 138, an adaptive character segmentation engine 140, and license plate reading engine 142 shown in FIG. 9.

Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g., through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing apparatus, create means for implementing the functions/acts specified in the block or blocks discussed herein such as, for example, the various instructions, modules, etc., discussed herein.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 10:
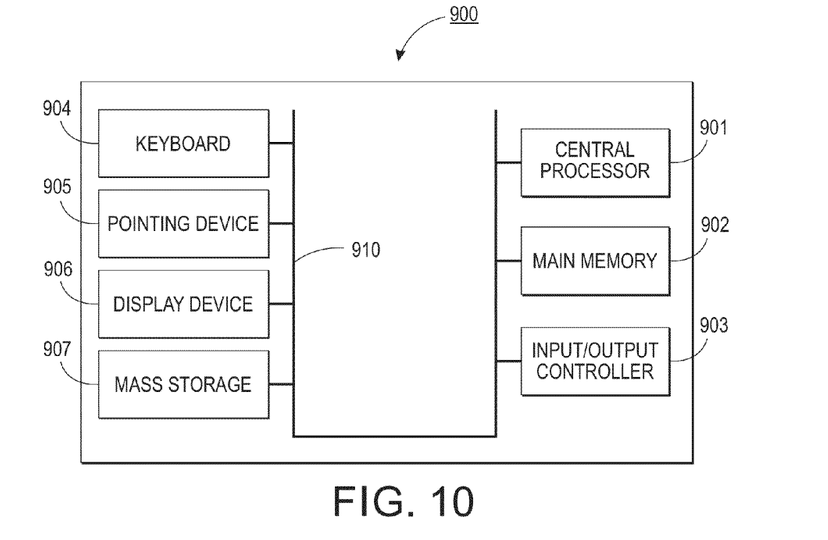
FIG. 10 illustrates a schematic view of a computer system, which can be implemented in accordance with one or more of the disclosed embodiments.
Figure 11:
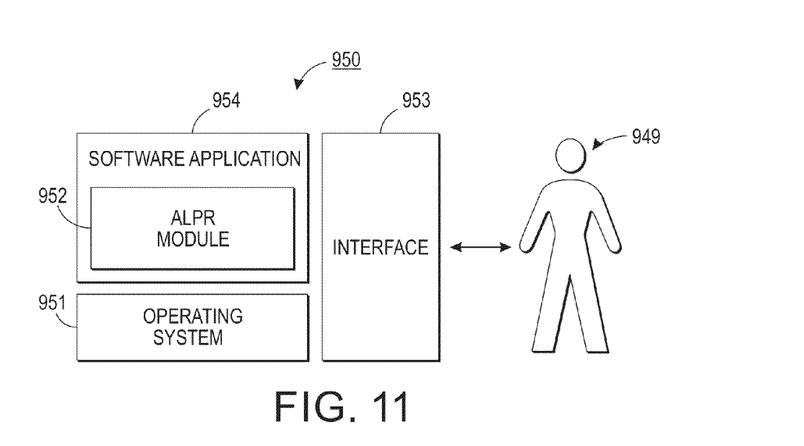
FIG. 11 illustrates a schematic view of a software system including an ALPR module using augmented data, an operating system, and a user interface, in accordance with the disclosed embodiments.

FIGS. 10-11 are provided as exemplary diagrams of data-processing environments in which embodiments of the present invention may be implemented. It should be appreciated that FIGS. 10-11 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 10, the disclosed embodiments may be implemented in the context of a data-processing system 900 that includes, for example, a central processor 901 (or other processors), a main memory 902, an input/output controller 903, and in some embodiments, a USB (Universal Serial Bus) or other appropriate peripheral connection. System 900 can also include a keyboard 904, an input device 905 (e.g., a pointing device such as a mouse, track ball, pen device, etc.), a display device 906, and a mass storage 907 (e.g., a hard disk). As illustrated, the various components of data-processing system 900 can communicate electronically through a system bus 910 or similar architecture. The system bus 910 may be, for example, a subsystem that transfers data between, for example, computer components within data-processing system 900 or to and from other data-processing devices, components, computers, etc.

It can be appreciated that in some embodiments the processor 901 may process instructions from, for example, the image capture engine 138, the adaptive character segmentation engine 140, and the license plate reading engine 142 shown in FIG. 9, and that in fact the data-processing system 900 may function as the local processor 136, or, for example, the back office system 132 shown in FIG. 9 and further can communicate with, for example, the camera 144, the illuminator 146, the trigger 148, and so forth, as shown in the example ALPR system 130 depicted in FIG. 9.

FIG. 11 illustrates a computer software system 950, which may be employed for directing the operation of the data-processing system 900 depicted in FIG. 10. Software application 954, stored in main memory 902 and on mass storage 907, generally can include and/or can be associated with a kernel or operating system 951 and a shell or interface 953. One or more application programs, such as module(s) 952, may be "loaded" (i.e., transferred from mass storage 907 into the main memory 902) for execution by the data-processing system 900. In the example shown in FIG. 11, module 952 can be implemented as, for example, a module that performs various ALPR logical instructions or operations such as those shown in FIG. 3-4 herein.

The data-processing system 900 can receive user commands and data through user interface 953 accessible by a user 949. These inputs may then be acted upon by the data-processing system 900 in accordance with instructions from operating system 951 and/or software application 954 and any software module(s) 952 thereof.

The discussion herein is thus intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 952) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, mini-computers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 953 (e.g., a graphical user interface) can serve to display results, whereupon a user may supply additional inputs or terminate a particular session. In some embodiments, operating system 951 and interface 953 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 951 and interface 953. The software application 954 can include, for example, an ALPR module 952, which can include instructions for carrying out the various steps, logical operations, and/or modules discussed herein. Examples of such steps or logical operations include, for example, the logical operations shown in FIGS. 3 and 4. Other examples of steps or operations that can be implemented via the ALPR module 952 include the various "engines" or software modules and components of the ALPR system 130 shown in FIG. 9.

FIGS. 10-11 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Based on the foregoing, it can be appreciated that a number of embodiments, preferred and alternative, are disclosed herein. For example, in a preferred embodiment, a method for adaptive character segmentation in an automatic license plate recognition application can be implemented. Such a method can include, for example, the steps or logical operations of identifying a region of interest in an image of a license plate acquired via an automatic license plate recognition engine; segmenting of the characters in the image with respect to the region of interest using a histogram projection associated with particular segmentation threshold parameters; and iteratively validating the characters in the image if a minimum number of valid characters is determined based on the histogram projection and the particular segmentation threshold parameters to produce character images sufficient to identify the license plate.

In another embodiment, a step or logical operation can be implemented for increasing the histogram projection by cutting the particular segmentation threshold parameters, repeating the segmenting of the characters, and validating the characters. In still another embodiment, a step or logical operation can be provided for performing a segmentation error recovery operation with respect to the characters iteratively validated. In yet another embodiment, a step or logical operation can be implemented for outputting at least one character image iteratively validated and associated with the image to an optical character recognition engine for further processing.

In another embodiment, a step or logical operation can be implemented for using feedback from an output metric to increase an aggressiveness of the particular segmentation threshold parameters until a result that is sufficiently believable to validate the characters. In yet another embodiment, a step or logical operation can be provided for determining if an overall confidence threshold is met with respect to iteratively validating the characters and assist in identifying the license plate.

In another embodiments, steps or logical operations can be implemented for increasing the histogram projection by cutting the particular segmentation threshold parameters and repeating the segmenting of the characters and the validating the characters; and performing a segmentation error recovery operation with respect to the characters iteratively validated.

In another embodiment, a system for adaptive character segmentation in an automatic license plate recognition application can be implemented. Such a system can include, for example, a processor, a data bus coupled to the processor; and a computer-usable medium embodying computer program code. Such a computer-usable medium can be coupled to the data bus, and the computer program code can include instructions executable by the processor and configured, for example, for: identifying a region of interest in an image of a license plate acquired via an automatic license plate recognition engine; segmenting of the characters in the image with respect to the region of interest using a histogram projection associated with particular segmentation threshold parameters; and iteratively validating the characters in the image if a minimum number of valid characters is determined based on the histogram projection and the particular segmentation threshold parameters to produce character images sufficient to identify the license plate.

In another system embodiment, such instructions can be further configured for increasing the histogram projection by cutting the particular segmentation threshold parameters, repeating the segmenting of the characters, and validating the characters. In another system embodiment, such instructions can be further configured of processing a segmentation error recovery operation with respect to the characters iteratively validated. In still another system embodiment, such instructions can be further configured for outputting at least one character image iteratively validated and associated with the image to an optical character recognition engine for further processing. In yet another system embodiment, such instructions can be further configured for using feedback from an output metric to increase an aggressiveness of the particular segmentation threshold parameters until a result that is sufficiently believable to validate the characters.

In another system embodiment, such instructions can be further configured for determining if an overall confidence threshold is met with respect to iteratively validating the characters and assist in identifying the license plate. In still another system embodiment, such instructions can be further configured for: increasing the histogram projection by cutting the particular segmentation threshold parameters, repeating the segmenting of the characters, and validating the characters; and processing a segmentation error recovery operation with respect to the characters iteratively validated.

In another embodiment, a processor-readable medium storing computer code representing instructions to cause a process for adaptive character segmentation in an automatic license plate recognition application can be implemented. Such computer code can include computer code to, for example: identify a region of interest in an image of a license plate acquired via an automatic license plate recognition engine; segment of the characters in the image with respect to the region of interest using a histogram projection associated with particular segmentation threshold parameters; and iteratively validate the characters in the image if a minimum number of valid characters is determined based on the histogram projection and the particular segmentation threshold parameters to produce character images sufficient to identify the license plate.

In another embodiment, such code can further include code to increase the histogram projection by cutting the particular segmentation threshold parameters, repeating the segmenting of the characters, and validating the characters. In yet another embodiment, such code can further include code to perform a segmentation error recovery operation with respect to the characters iteratively validated. In another embodiment, such code can further include code to output at least one character image iteratively validated and associated with the image to an optical character recognition engine for further processing. In another embodiment, such code can further include code to use feedback from an output metric to increase an aggressiveness of the particular segmentation threshold parameters until a result that is sufficiently believable to validate the characters. In yet another embodiment, such code can further include code to determine if an overall confidence threshold is met with respect to iteratively validating the characters and assist in identifying the license plate.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for adaptive character segmentation in an automatic license plate recognition application, said method comprising:
    identifying via at least one processor a region of interest in an image of a license plate acquired via an automatic license plate recognition engine that communicates with said at least one processor;
    segmenting via said at least one processor said characters in said image with respect to said region of interest using a histogram projection associated with particular segmentation threshold parameters;
    iteratively validating said characters in said image via said at least one processor if a minimum number of valid characters is determined based on said histogram projection and said particular segmentation threshold parameters to produce character images sufficient to identify said license plate; and
    increasing said particular segmentation threshold parameters in small steps to avoid over-segmentation.

2. The method of claim 1 further comprising increasing said histogram projection by cutting said particular segmentation threshold parameters and repeating said segmenting of said characters and said validating said characters.

3. The method of claim 2 further comprising performing a segmentation error recovery operation with respect to said characters iteratively validated.

4. The method of claim 3 further comprising outputting at least one character image iteratively validated and associated with said image to an optical character recognition engine for further processing.

5. The method of claim 3 further comprising using feedback from an output metric to increase an aggressiveness of said particular segmentation threshold parameters until a result that is sufficiently believable to validate said characters.

6. The method of claim 5 further comprising determining if an overall confidence threshold is met with respect to iteratively validating said characters and assist in identifying said license plate.

7. The method of claim 1 further comprising:
    increasing said histogram projection by cutting said particular segmentation threshold parameters and repeating said segmenting of said characters and said validating said characters; and
    performing a segmentation error recovery operation with respect to said characters iteratively validated.

8. A system for adaptive character segmentation in an automatic license plate recognition application, said system comprising:
    at least one processor;
    a data bus coupled to said at least one processor; and
    a computer-usable medium embodying computer program code, said computer-usable medium being coupled to said data bus, said computer program code comprising instructions executable by said at least one processor and configured for:
        identifying a region of interest in an image of a license plate acquired via an automatic license plate recognition engine that communicates with said at least one processor;
        segmenting said characters in said image with respect to said region of interest using a histogram projection associated with particular segmentation threshold parameters;
        iteratively validating said characters in said image if a minimum number of valid characters is determined based on said histogram projection and said particular segmentation threshold parameters to produce character images sufficient to identify said license plate; and
        increasing said particular segmentation threshold parameters in small steps to avoid over-segmentation.

9. The system of claim 8 wherein said instructions are further configured for increasing said histogram projection by cutting said particular segmentation threshold parameters and repeating said segmenting of said characters and said validating said characters.

10. The system of claim 8 wherein said instructions are further configured for processing a segmentation error recovery operation with respect to said characters iteratively validated.

11. The system of claim 10 wherein said instructions are further configured for outputting at least one character image iteratively validated and associated with said image to an optical character recognition engine for further processing.

12. The system of claim 11 wherein said instructions are further configured for using feedback from an output metric to increase an aggressiveness of said particular segmentation threshold parameters until a result that is sufficiently believable to validate said characters.

13. The system of claim 10 wherein said instructions are further configured for determining if an overall confidence threshold is met with respect to iteratively validating said characters and assist in identifying said license plate.

14. The system of claim 8 wherein said instructions are further configured for:
    increasing said histogram projection by cutting said particular segmentation threshold parameters and repeating said segmenting of said characters and said validating said characters; and
    processing a segmentation error recovery operation with respect to said characters iteratively validated.

15. A processor-readable medium storing computer code representing instructions to cause a process for adaptive character segmentation in an automatic license plate recognition application, said computer code comprising computer code to:
    identify a region of interest in an image of a license plate acquired via an automatic license plate recognition engine;
    segment said characters in said image with respect to said region of interest using a histogram projection associated with particular segmentation threshold parameters;
    iteratively validate said characters in said image if a minimum number of valid characters is determined based on said histogram projection and said particular segmentation threshold parameters to produce character images sufficient to identify said license plate; and
    increase said articular segmentation threshold parameters in small steps to avoid over-segmentation.

16. The processor-readable medium of claim 15 wherein said code further comprises code to increase said histogram projection by cutting said particular segmentation threshold parameters and repeating said segmenting of said characters and said validating said characters.

17. The processor-readable medium of claim 16 wherein said code further comprises code to perform a segmentation error recovery operation with respect to said characters iteratively validated.

18. The processor-readable medium of claim 17 wherein said code further comprises code to output at least one character image iteratively validated and associated with said image to an optical character recognition engine for further processing.

19. The processor-readable medium of claim 17 wherein said code further comprises code to use feedback from an output metric to increase an aggressiveness of said particular segmentation threshold parameters until a result that is sufficiently believable to validate said characters.

20. The processor-readable medium of claim 18 wherein said code further comprises code to determine if an overall confidence threshold is met with respect to iteratively validating said characters and assist in identifying said license plate.

* * * * *